United States Patent [19]

Stanhope

[11] Patent Number: 5,672,421

[45] Date of Patent: Sep. 30, 1997

[54] HETEROFILAMENTS FOR CORD REINFORCEMENT IN RUBBER GOODS

[75] Inventor: Harry W. Stanhope, Concord, N.C.

[73] Assignee: Hoechst Celanese Corporation, Somerville, N.J.

[21] Appl. No.: 662,428

[22] Filed: Aug. 19, 1996

Related U.S. Application Data

[60] Division of Ser. No. 323,164, Oct. 13, 1994, which is a continuation-in-part of Ser. No. 20,875, Feb. 19, 1993, abandoned.

[51] Int. Cl.$^6$ ............................. B32B 5/00; F16G 1/00; F16G 5/00; F16G 7/00
[52] U.S. Cl. ............................ 428/295; 474/237; 474/238; 474/265; 474/266; 428/288; 428/292; 428/294
[58] Field of Search ........................... 428/98, 288, 292, 428/294, 295; 474/237, 238, 265, 266

[56] References Cited

U.S. PATENT DOCUMENTS 4,522,614  6/1985  Matsuoka et al. .
5,162,153  11/1992  Cooke et al. .

FOREIGN PATENT DOCUMENTS

2286939  4/1989  Japan .

*Primary Examiner*—Richard Weisberger
*Attorney, Agent, or Firm*—Gregory N. Clements; Miles B. Dearth

[57] ABSTRACT

In an improved power transmission belt, the circumferentially disposed reinforcing cords are made from multi-filament yarns of heterofilaments. These cords, when fused, have good inter-filament bonding without the solvent of the solvent/adhesive systems.

5 Claims, 10 Drawing Sheets

HETEROFILAMENTS FOR CORD REINFORCEMENT IN RUBBER GOODS

This is a division of application Ser. No. 08/323,164 filed Oct. 13, 1994, pending, which is a continuation-in-part of Ser. No. 08/020,875 filed Feb. 19, 1993, now abandoned.

FIELD OF THE INVENTION

This invention is directed to heterofilament yarns being used for the cord reinforcement in rubber goods, for example power transmission belts.

BACKGROUND OF THE INVENTION

Power transmission belts, for example V-belts and ribbed V-belts, are well known (See: Wake, N.C., et al., "Textile Reinforcement of Elastomers", Applied Science Publishers, Englewood, N.J., 1982). Such power transmission belts typically comprise rubber impregnated fabric layers disposed on the belt's innermost and outermost circumerential surfaces, and a layer of a masticated rubber/staple fiber mixture and a layer of circumferentially disposed reinforcing cord being sandwiched therebetween. The reinforcing cord or "stiff cord" is typically made from an adhesive impregnated, multi-filament yarn. Explemary yarns include filaments of nylon, polyester, and rayon, polyester being referred because of its superior properties.

Generally, these belts are made by laying up the above-mentioned layers, in an inverted order, on a drum. First, a layer of rubber impregnated fabric is laid on the drum. Then, the reinforcing cords are laid up. Next, a layer of masticated rubber/staple fiber is laid up. Finally, a second layer of rubber impregnated fabric is applied to the construction. The foregoing is then vulcanized, thereby forming a "large tube". From this tube, individual belts are cut.

One problem with this type of belt is "cord pop-out". "Cord pop-out", or fraying of cord from the belt's cut edge, seriously diminishes the belt's useable life span because the loss of cord from the belt accelerates wear on the belt leading to its ultimate failure. Cord pop-out and situations which lead to cord pop-out can arise during manufacture and use of the belt. In manufacture, when belts are cut from the tube, the cord or the yarn in the cord can be stripped away. In use, as the belts leaves the sheave, the cord or the yarn may "pop-out" of the belt because of the reduction of lateral compressive force on the belt.

"Cord pop-out" is such a serious concern that the reinforcing cords or "stiff cords" are impregnated with an adhesive to facilitate inter-filament bonding. Inter-filament bonding within the yarn and cord reduces the possibility of individual filaments popping from the belt and begin fraying from the belt. Typical adhesives for inter-filament bonding include isocyanate systems which are normally applied to the cord in a solvent carrier. The solvent/isocyanate systems is necessary so that the isocyanate penetrates in between the filaments of the yarn and thereby facilitates inter-filament bonding (See: Wake, W. C., *Ibid.*, pg. 89–90). These solvents, however, pose significant environmental problems (See: Wake, N. C., *Ibid.*). These adhesive systems for inter-filament bonding should be differentiated from the resinol-formaldehyde-latex (RFL) systems (aqueous based systems) which are applied to the cord. The RFL systems enhance and promote adhesion of the cord to the surrounding rubber.

There is also a need to develop new cord reinforcement products for the rubber goods industry. The rubber goods industry includes any rubber product which uses a reinforcing cord, e.g. power transmission belts, conveyor belts, tires, and the like. Polyester (i.e. polyethylene terephthalate) reinforcement cord is a reinforcement product of choice in most of those applications because of its strength and dimensional stability, but polyester cord suffers because of its inherently poor adhesion to rubber. Consequently, adhesives systems have been devised that overcome the poor adhesion. Work, however, continues to improve the adhesion of polyester to rubber.

Accordingly, there is a need to find a way to prevent cord pop-out in power transmission belts without the use of the solvent carrier for the isocyanate adhesive system.

SUMMARY OF THE INVENTION

This invention is directed to an improved power transmission belt having circumferentially disposed reinforcing cords. Each cord is made from multi-filament yarns. The improvement is the multi-filament yarns comprise heterofilaments.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
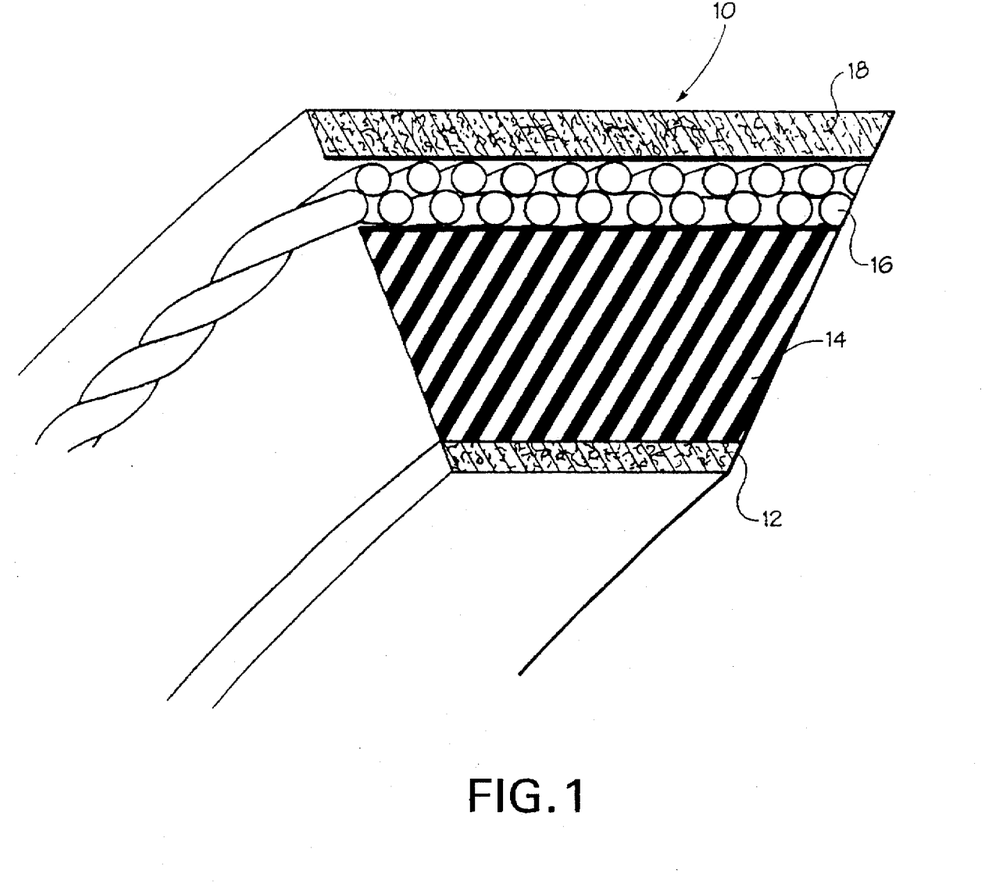
FIG. 1 is an isometric view of the cross section of a power transmission belt.

Referring to FIG. 1, there is shown a power transmission belt 10. Belt 10 is representative of the construction of power transmission belts, and illustrates the invention, however, this particular construction should not be construed as limiting the invention. Belt 10 is referred to, by those of ordinary skill in the art, as "cut edge" or "raw edge" V-belt. Those of ordinary skill will readily recognize the applicability of this invention to other power transmission belts, e.g. ribbed V-belts.

The components of belt 10 generally include: a rubber coated fabric 12; a layer 14 of masticated rubber with a fiber filler; a reinforced cord section 16; and a rubber coated fabric 18. These power transmission belts may be manufactured in any conventional manner using conventionally available components. See, for manner, for example see: "Vanderbilt Rubber Handbook", R. T. Vanderbilt Co., Inc., Norwalk, Conn. (1978).; Blow, C. M., et al. (ed.), "Rubber Technology and Manufacture", 2nd Edition, The Plastics and Rubber Institute University Press, NY, N.Y., (1989).; and Wake, W. C., et al., "Textile Reinforcement of Elastomers" Applied Science , Publishers, Englewood, N.J., (1982).; each of these references are incorporated herein by reference.

The term "filament" or "fiber", as used herein, refers to the components which make up a yarn. The term "yarn", as used herein, is a generic term for a continuous strand of fibers, or filaments. The term "cord", as used herein, refers to the product formed by twisting together or "plying" one or more yarns.

Figure 2:
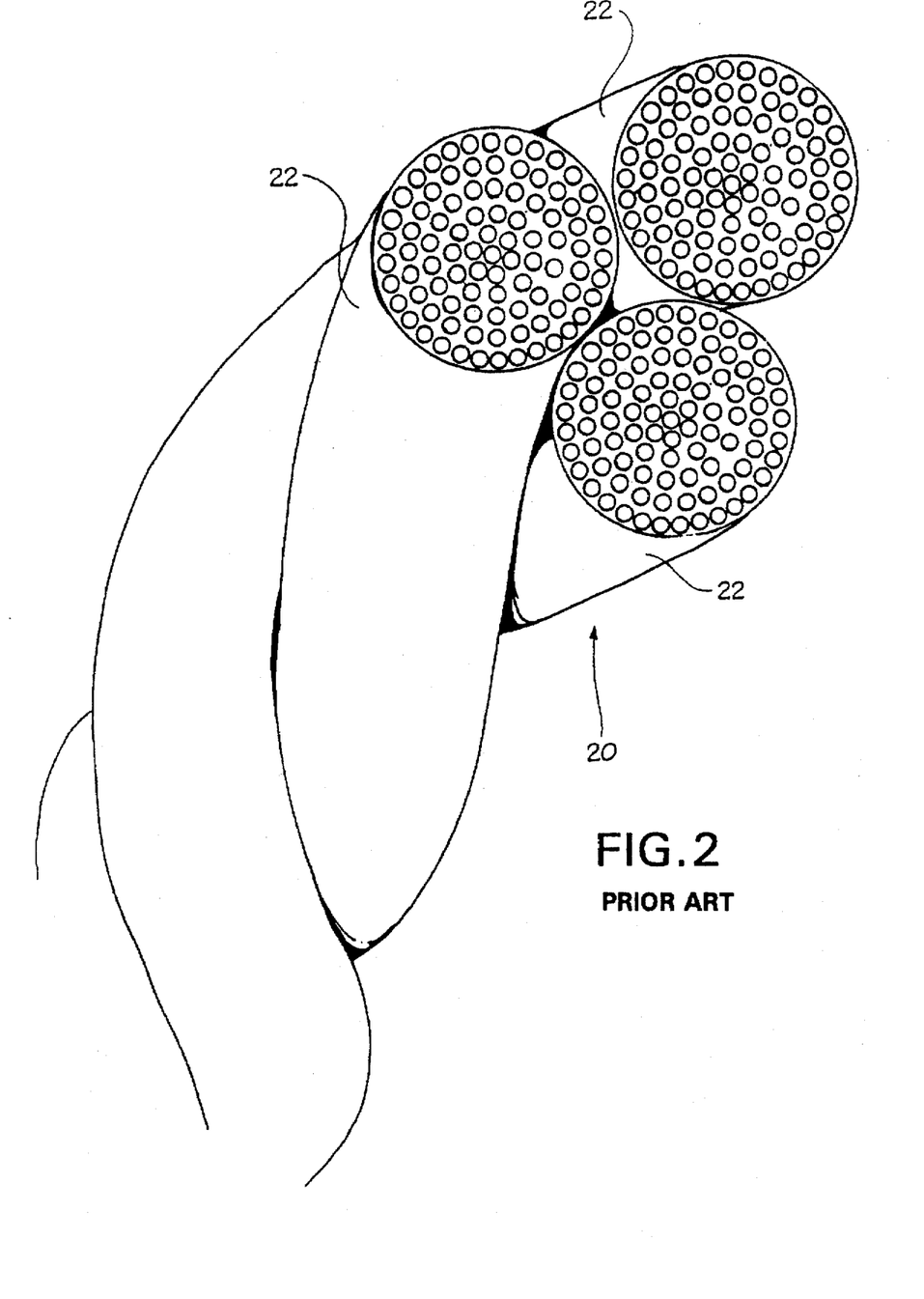
FIG. 2 is an isometric cross sectional view of a prior art cord comprising of plurality of fibers.
Figure 3:
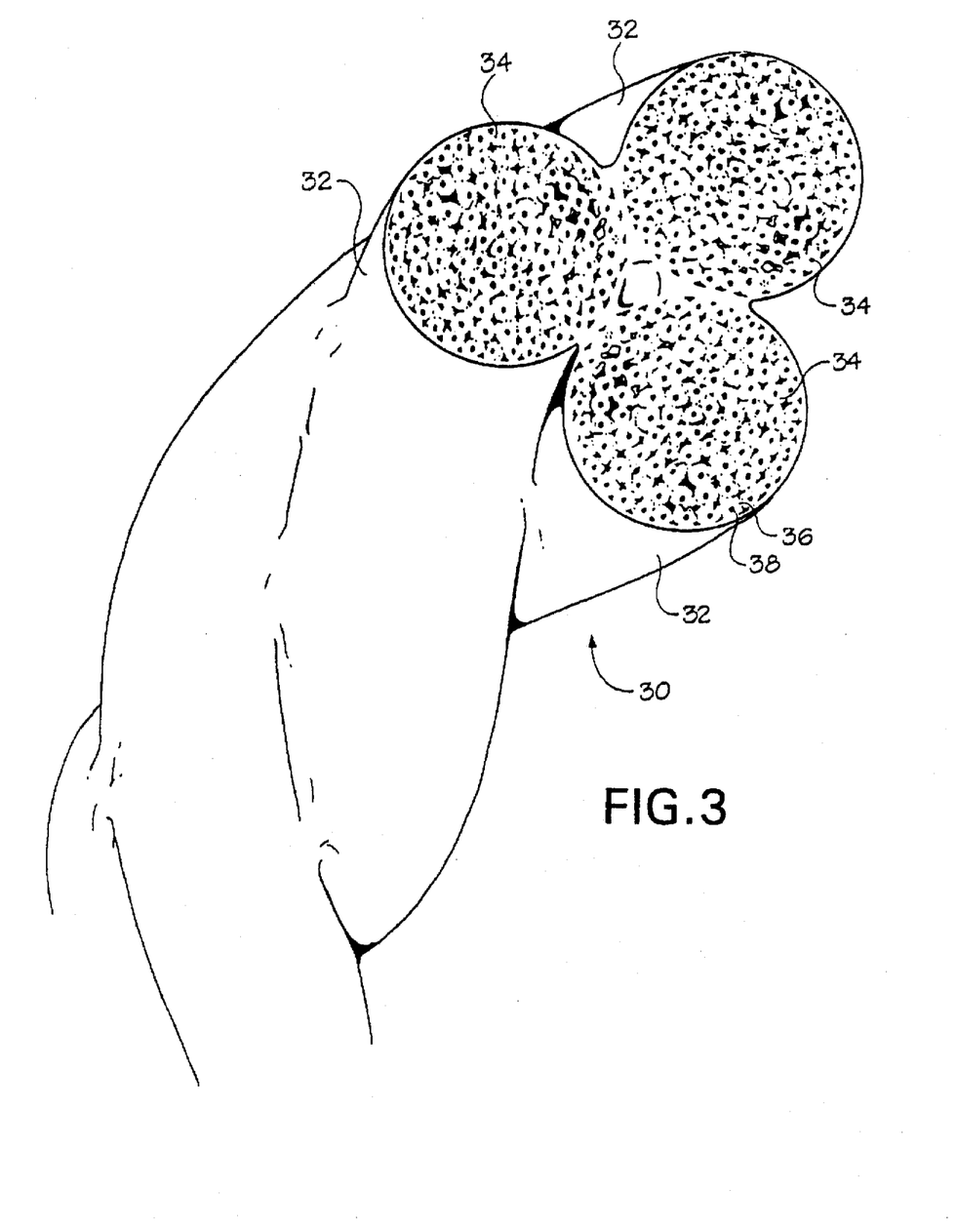
FIG. 3 is an isometric view of a cord made with heterofilaments according to the present invention.

Referring to FIGS. 2 and 3, a prior art cord 20 and inventive cord 30 are illustrated respectively. Both cords are shown as being made from three plied yarns. Cords used in the manufacture of power transmission belts are not so limited and neither is the instant invention. Prior art cord 20 comprises three plied yarns 22. Yarn 22 may be a 1000 total denier yarn of 192 filaments. The individual filaments are bound together with an adhesive system (i.e., the interfilament bonding systems) as discussed above.

Cord 30 comprises yarns 32. Yarns 32 comprise heterofilaments 34. Heterofilaments 34 are illustrated as, but not limited to, sheath/core heterofilaments. Sheath 36 surrounds core 38. These heterofilaments 34 include a fuseable portion (e.g., sheath 36) which can eliminate the need for the solvent/adhesive systems, because the heterofilaments, when heated under pressure, as is well known, can bond to one another. These heterofilaments 34 may be fused prior to manufacture of the belt or during vulcanization of the belt or a combination of both.

Heterofilaments are known in the art (e.g., see U.S. Pat. Nos. 3,616,183 and 3,998,988, both are incorporated herein by reference). Heterofilaments are known as "bi-component fibers", "conjugate fibers", "heterofils", or "composite fibers". Heterofilament, as used herein, refers to a filament made from a thermoplastic, synthetic, organic polymer composed of a relatively high melting polymer component and a relatively low melting polymer component. Generally, the heterofilaments are either a sheath/core type or a side-by-side type. In either embodiment, both components of the heterofilament will be present in a continuous phase.

The high melting point polymer component may have a melting point about 30° C. greater than that of the lower melting point polymer component. Preferably, a sheath/core heterofilament is used, with the core comprising of about 80% of the heterofilament.

The polymer used for the production of the heterofilament is a thermoplastic, synthetic, organic polymer. Examples of the polymer include, but are not limited to: polyesters; polyamides; polyolefins; polystrenes; polyurethanes; polyesteramides; and mixtures thereof.

The high-melting point polymer component maybe a polyester or a polyamide. The polyester maybe polyester terephthalate (PET). The polyamide maybe nylon-6 or nylon-6,6.

The low-melting point polymer component maybe selected from the following exemplary polymers: polystrenes; polyolefins; polyvinyls; polyesters; or polyurethanes. Non-limiting examples of the foregoing polymers are as follows: polyolefins; polyethlene, polyproplene; polyvinyls-polyacrylonitrile, polyvinyl chloride; and polyesters—polybutylene terephthalate or polyester modified with an acid or a glycol. Examples of the forementioned acid include, but are not limited to: isophthalic acid; phthalic acid; adipic acid; sebacic acid. Examples of the forementioned glycol include, but are not limited to: trimethylene glycol; hexamethylene glycol; cyclohexane dimethanol.

Preferrably, the core comprises polyethylene terephthalate (PET) and the sheath comprises polybutylene terephthalate (PBT).

The PBT/PET sheath/core heterofilament has improved adhesion to rubber that is beneficial in the manufacture of V-belts and other rubber products requiring fiber reinforcement.

The cord to rubber adhesion is improved by the use of PBT/PET-based cord versus conventional polyethylene terephalate cords (i.e., non-heterofilaments). This effect is applicable to any adhesive activated or non-adhesive activated yarn using an adhesive system of, for example, Resinol-Formaldehyde-Latex (RFL) adhesives and RFL's modified with phenol-blocked methylene diisocyanates and/or caprolactan-blocked methylene diisocyanate, and any of the foregoing maybe modified with a topcoat (for example containing 0.10% by weight silane epoxy). The effect is not apparently applicable when a combination of Ner 10A epoxy and phenol-blocked methylene diisocyanate adhesives is used.

EXAMPLE

Improved cord to rubber adhesion is demonstrated in the following examples. The adhesion of rubber to cord is examined by comparing a conventional polyester (i.e. polyethylene terephthalate) cord (i.e. Hoechst Celanese's T793 yarn product) to the inventive material (cord made from PBT/PET sheath/core yarns). The cord construction is 1000/2/3, unless otherwise noted. Each yarn (conventional and heterofilament) is adhesive activated, for example see U.S. Pat. No. 5,328,765 incorporated herein by reference. The cords are treated with conventional RFL's or RFL's modified with phenol-blocked methylene diisocyanate with a two zone drying/cure of either 300° F. for 90 sec at 4530 g tension followed by 460° F. for 90 sec at 6804 g tension, or 300° F. for 90 sec at 4530 g tension followed by 450° F. for 90 sec at 6804 g tension, or 300° F. for 90 sec at 4530 g tension followed by 450° F. for 90 sec at 6804 g tension. The cords treated with the combination of Ner 10A epoxy and phenol-blocked methylene diisoryanate were treated in a double dip system with the epoxy cure at 440° F. for 30 sec at 4530 g tension and the RFL cure at 225° F. for 70 sec at 4530 g followed by 450° F. for 50 sec at 6804 g tension.

The test strips were made as follows: A layer of rubber is wrapped around a wind up drum. This is followed by a layer of the test sample. The samples are cut and sandwiched with a layer of thin rubber between them. After curing in a steam heated press, the samples are cut into one inch strips and pulled apart under heat on an Instron-type tensile tester. The average number of pounds to pull the strip apart is a measure of the peel resistance of the sample. Samples maybe tested at room temperature, at 250° F. (in an environmental chamber), or after a 2 hr steaming in an autoclave (15 psi steam).

The rubbers used include: "PET" from Michelin (a tire rubber formerly a product of Uniroyal-Goodrich); Neoprene "D" (used in V-belts); and neoprene (a Goodyear product for V-belts).

The results are reported as follows: Adhesion (in pounds/inch) is shown a function of the cord and adhesive system; also reported is a visual rating of 0–5 that indicates where failure occured i.e. at the cord/rubber interface or in the rubber, wherein "0" indicates no rubber tear and "5" indicates complete rubber tear.

Figure 4:
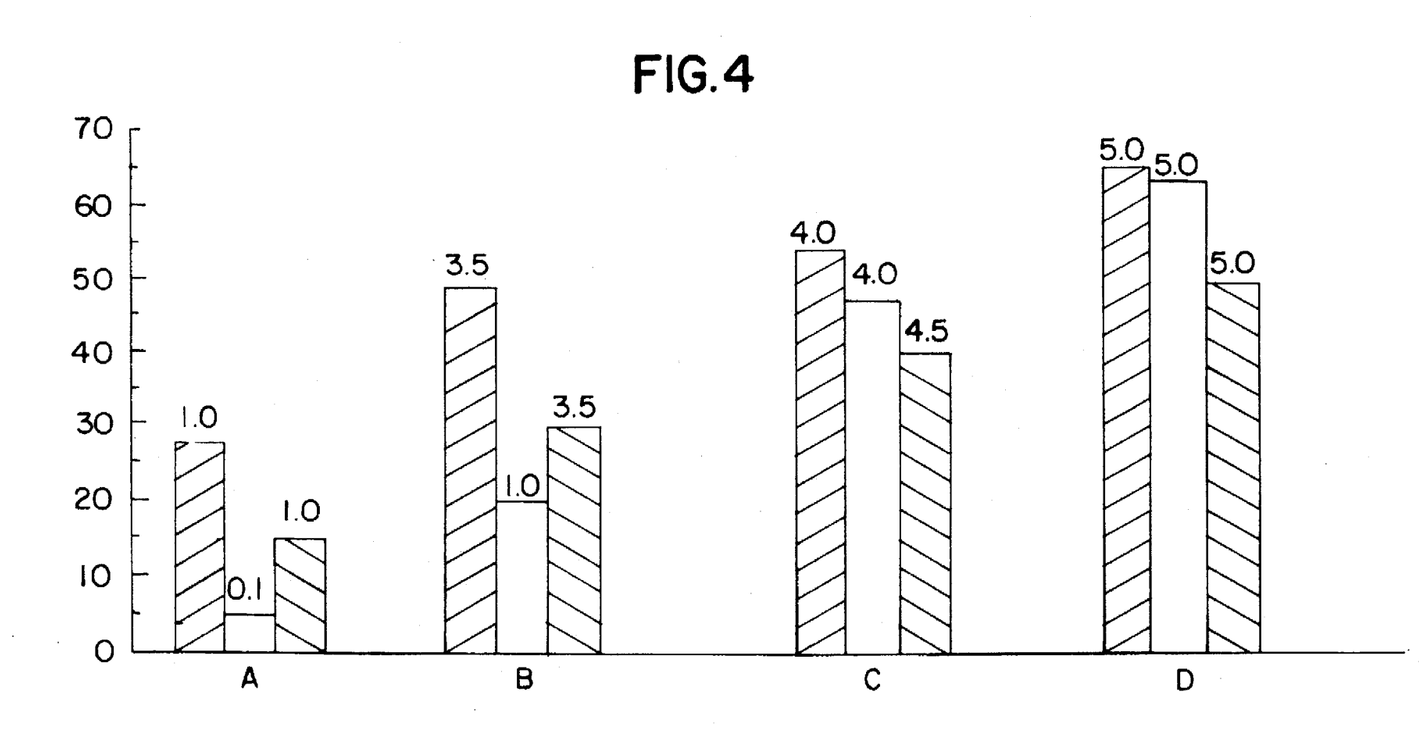
FIGS. 4–10 are charts that graphically illustrate the adhesion properties of the claimed invention.
Figure 5:
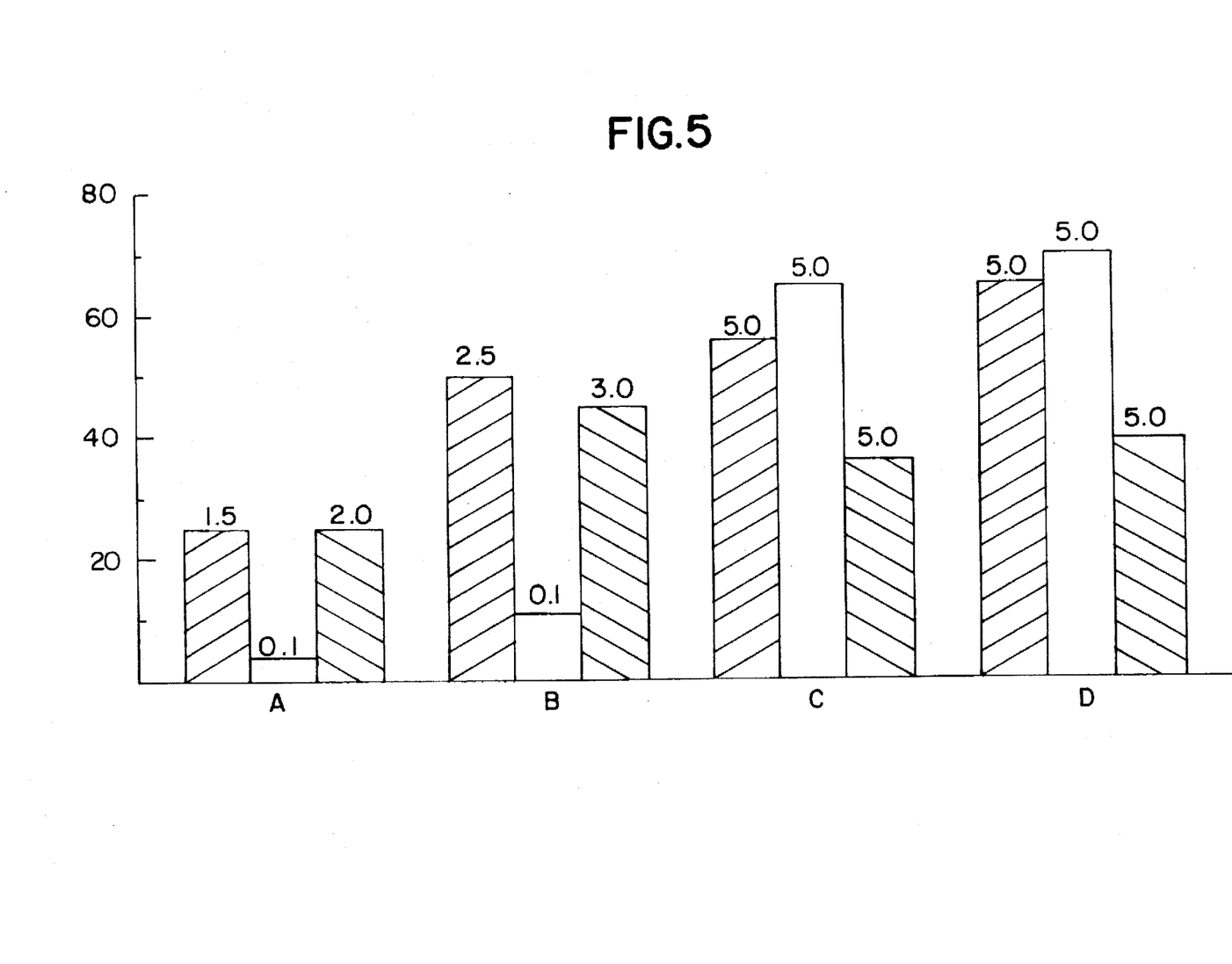
Figure 6:
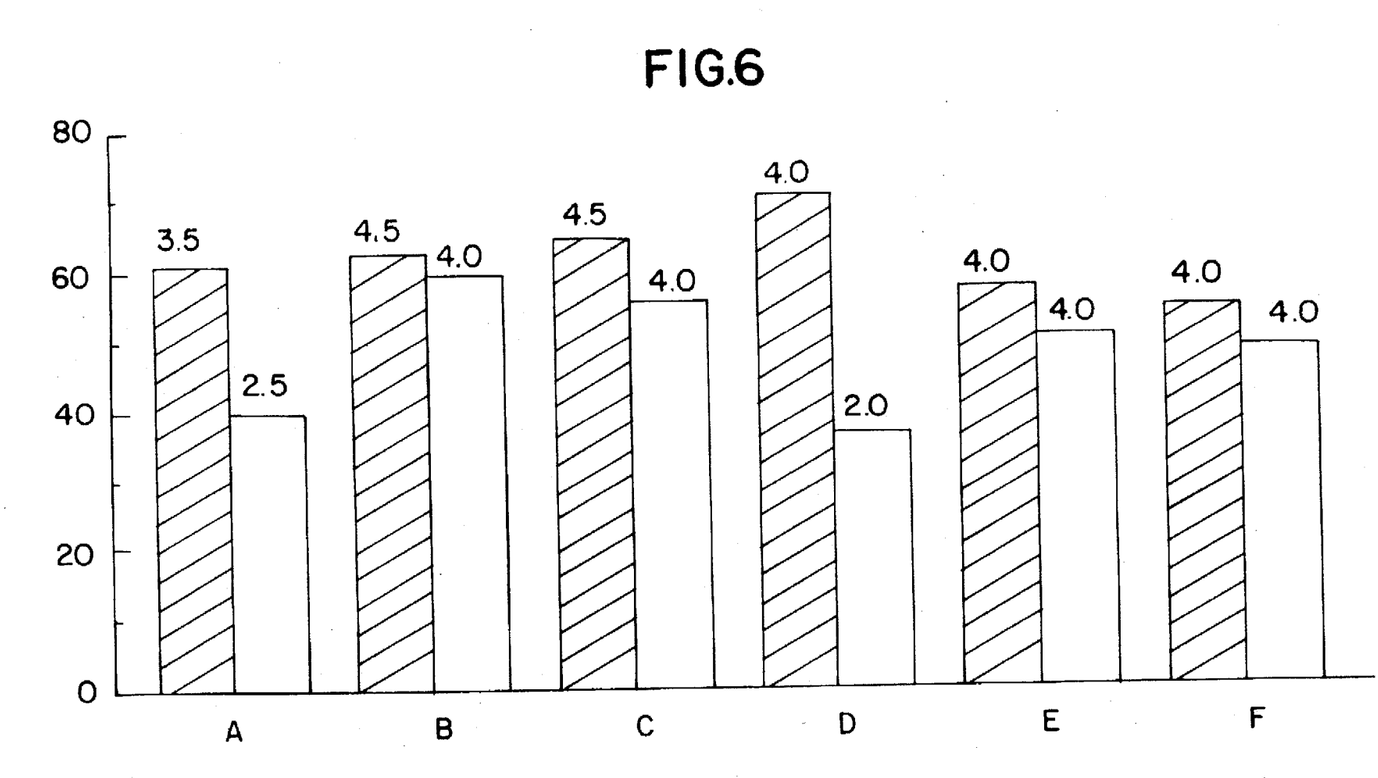
Figure 7:
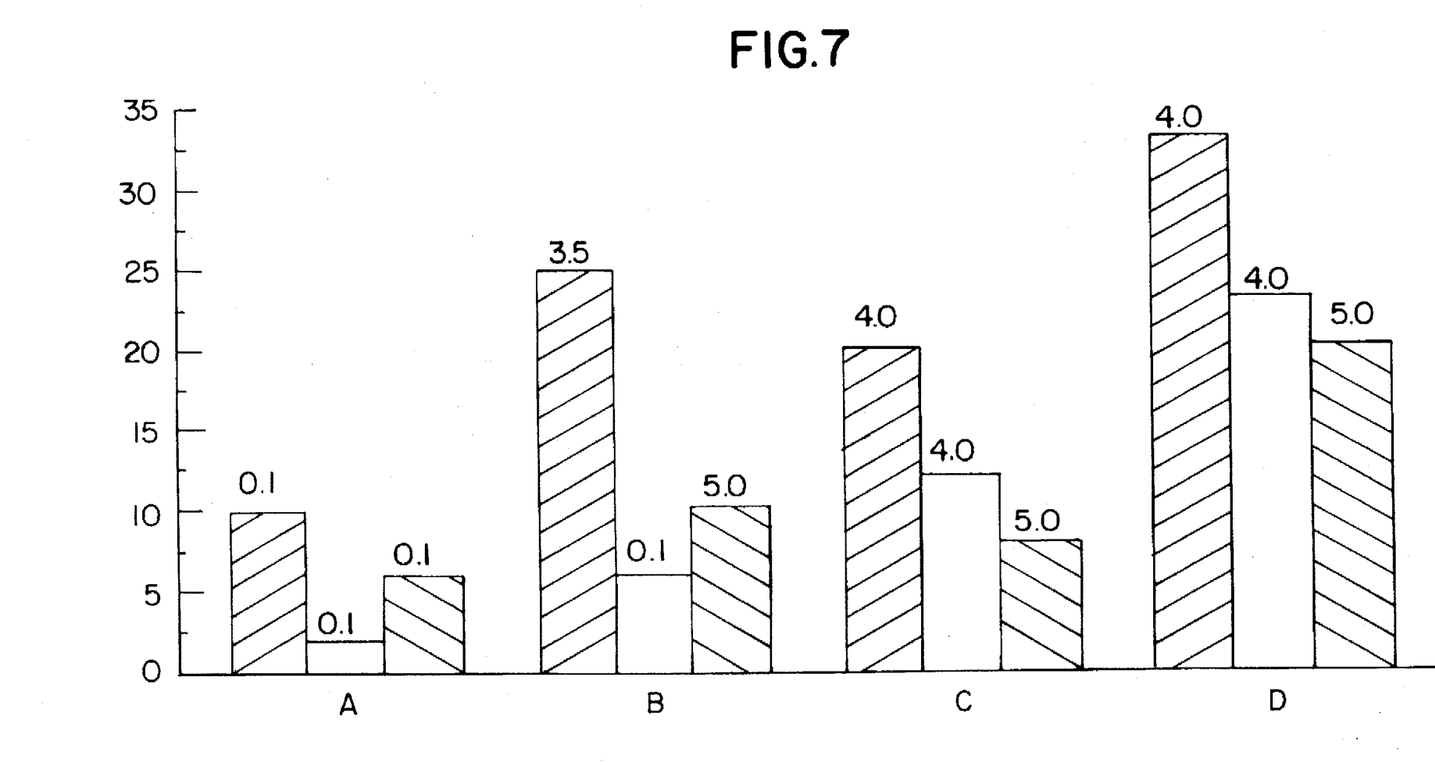

In FIGS. 4, 5, & 7, for each sample, the left hand bar is testing at room temperature, the middle bar, testing after 2 hr steaming, and the right, testing at 250° F. In FIGS. 6, & 8–10, for each sample, the left bar is testing at room temperature, and the right, after 2 hr. steaming.

In FIG. 4, "PET" type rubber is used and "A" is polyethylene terephthalate (PET) cord with RFL, "B" is PET cord with RFL and 5% by weight phenol-blocked methylene diisocyanate (LVBI), "C" is PBT/PET cord with RFL, and "D" is PBT/PET cord with RFL and 5% by weight phenol-blocked methylene diisocyanate (LVBI).

In FIG. 5, Neoprene "D" rubber is used and "A" is PET cord with RFL, "B" is PET cord with RFL/5% LVBI, "C" is PBT/PET cord-RFL, and "D" is PBT/PET cord-RFL/5% LVBI.

In FIG. 6, "PET" rubber is used and "A" is PET cord with Ner 10A epoxy/LVBI & RFL, "B" is PBT/PET cord-Ner 10A/LVBI & RFL, "C" is PBT/PET cord-Ner 10A/LVBI & RFL with a topcoat (containing 0.1% by weight silane epoxy), "D" is PET cord RFL/5% LVBI, "E" is PBT/PET cord with RFL/5% LVBI, and "F" is PBT/PET cord with RFL/5% LVBI with a topcoat (containing 0.1% silane) epoxy.

In FIG. 7, neoprene rubber is used and "A" is PET cord-RFL, "B" is PET cord-RFL/5% LVBI, "C" is PBT/PET cord-RFL and "D" is PBT/PET cord-RFL/5% LVBI.

Figure 8:
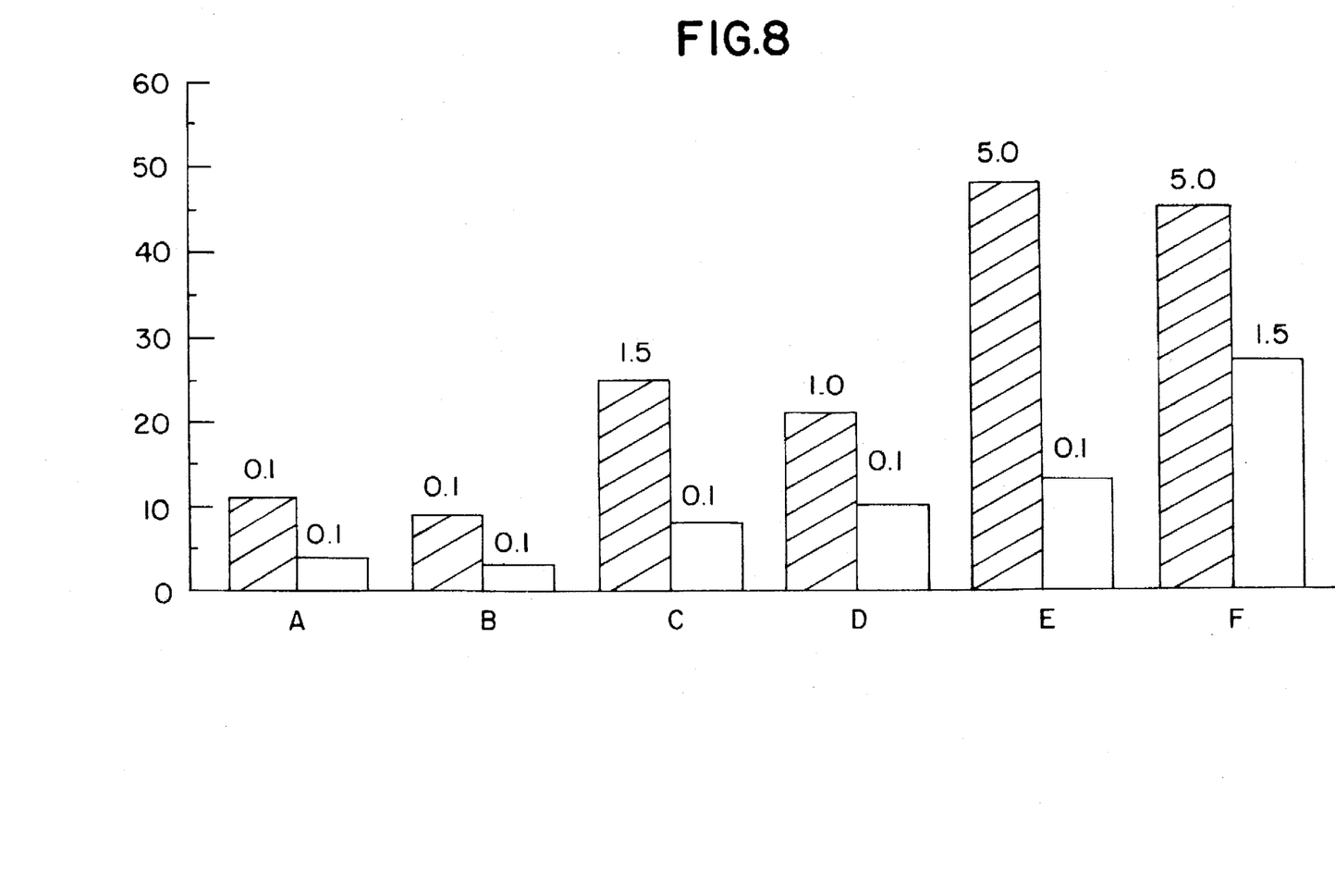

In FIG. 8, neoprene rubber is used and "A" is PET cord-RFL, "B" is PBT/PET cord-RFL, "C" is PBT/PET cord-RFL and a topcoating (0.1% silane epoxy), "D" is PET cord-RFL/5% LVBI, "E" is PBT/PET cord-RFL/5% LVBI, "F" is PBT/PET cord-RFL/5% LVBI and a topcoating (0.1% silane epoxy).

Figure 9:
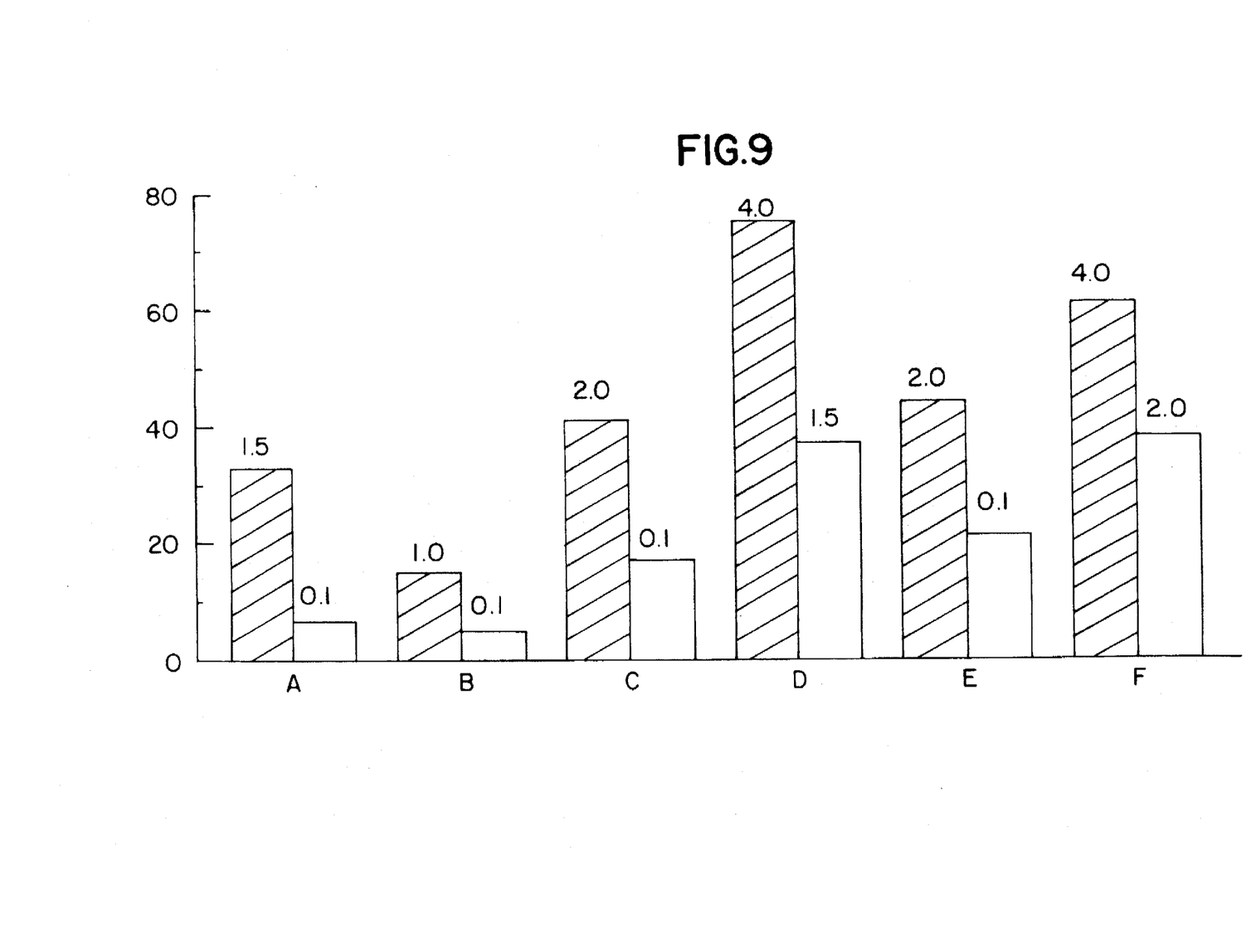

In FIG. 9, "PET" rubber is used and "A" is PET cord-RFL, "B" is PBT/PET cord-RFL, "C" is PBT/PET cord-RFL, and a topcoating (0.1% silane epoxy), "D" is PET cord-RFL/LVBI, "E" is PBT/PET cord-RFL/LVBI, and "F" is PBT/PET cord—RFL/LVBI, and a topcoating (0.1% silane epoxy).

Figure 10:
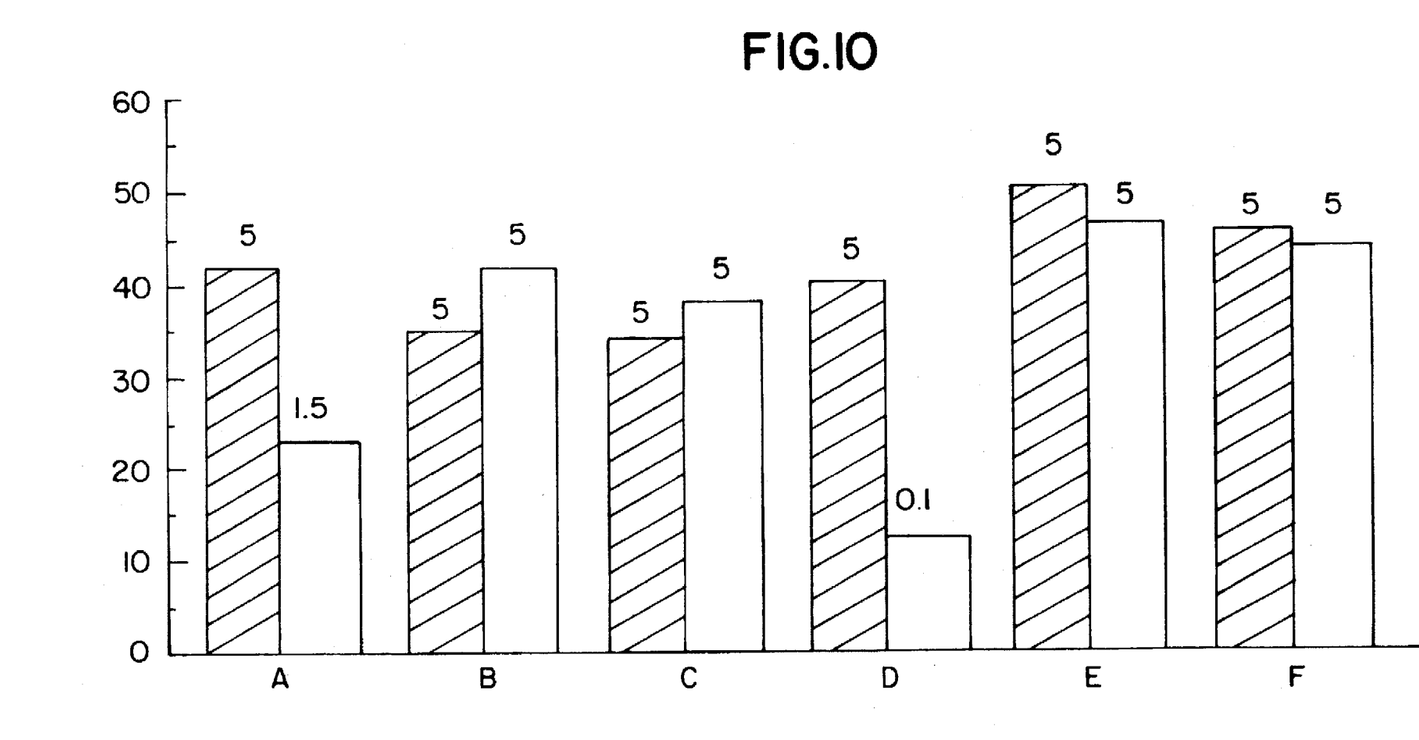

In FIG. 10, neoprene rubber is used and "A" is PET—Ner 10A epoxy LVBI & RFL, "B" is PBT/PET—Ner 10A epoxy/LVBI & RFL; "C" is PBT/PET—Ner 10A epoxy/ LVBI & RFL and a topcoat (0.1% silane epoxy); "D" is PET-RFL 15% LVBI; "E"—PBT/PET—RFL 15% LVBI; and "F"—PBT/PET—RFL 15% LVBI and topcoat (0.1% silane epoxy).

The present invention may be embodied in other specific forms without departing from the spirit or essential attributes thereof and, accordingly, reference should be made to the appended claims, rather than to the foregoing specification, as indicating the scope of the invention.

What is claimed is:

1. An article of manufacture comprising a cord adapted for reinforcing a rubber good, said cord being disposed within said good, said cord comprising a heterofilament, said heterofilament being a sheath/core filament, said sheath consisting essentially of polybutylene terephthalate; and said core comprises materials being selected from the group consisting of polystrene, polyolefin, polyvinyl, polyester, and polyurethane.

2. The article of claim 1 wherein said core comprises polyester.

3. The article of claim 1 wherein said polyester core comprises polyethylene terephthalate.

4. The article of claim 1 further comprising an adhesive system.

5. The article of claim 3 wherein said adhesive system comprises resinol-formaldehyde-latex.

* * * * *